United States Patent [19]

Gardner

[11] 3,859,581
[45] Jan. 7, 1975

[54] ANALOG TO DIGITAL TO ANALOG RATE CONTROL CIRCUIT FOR TRACTION MOTOR CONTROL SYSTEMS

[75] Inventor: Alvin L. Gardner, Erie, Pa.

[73] Assignee: General Electric Company, Erie, Pa.

[22] Filed: Jan. 11, 1974

[21] Appl. No.: 432,513

[52] U.S. Cl. ................................. 318/397, 318/603
[51] Int. Cl. ............................................. H02p 5/00
[58] Field of Search ........... 318/391, 393, 395, 397, 318/600–603

[56] References Cited
UNITED STATES PATENTS

| 3,309,597 | 3/1967 | Gabor et al. | 318/393 |
| 3,621,354 | 11/1971 | Fawcett et al. | 318/395 X |
| 3,627,080 | 12/1971 | Yuminaka et al. | 318/397 X |
| 3,828,168 | 8/1974 | O'Callaghan et al. | 318/603 X |

*Primary Examiner*—Robert K. Schaefer
*Assistant Examiner*—W. E. Duncanson, Jr.
*Attorney, Agent, or Firm*—Walter C. Bernkopf

[57] ABSTRACT

A circuit, primarily adapted for use as a rate control arrangement for traction vehicles, for limiting the rate of change of motor control signal to predetermined maximum magnitudes in order to limit rates of change of motor acceleration or deceleration. Digital clock pulses are continuously algebraically added, i.e., added or subtracted, by a bidirectional counter whose digital output is converted into an analog motor control output signal. This signal is supplied to a circuit for controlling motor performance. Consecutive clock pulses are either added or subtracted by the counter dependent upon a comparison of the magnitudes of the incoming motor control input signal and of the control output signal. The recurrence frequency of clock pulses is established to appropriately limit the maximum incremental change per unit time of the magnitude of the control output signal.

10 Claims, 4 Drawing Figures

ANALOG TO DIGITAL TO ANALOG RATE CONTROL CIRCUIT FOR TRACTION MOTOR CONTROL SYSTEMS

BACKGROUND OF THE INVENTION

This invention relates to control systems for electric drive motors, such as vehicle traction motors, and more particularly to an improved arrangement for limiting the rate of change of a motor control signal.

The invention while generally applicable to control systems for drive motors is specifically applicable to motor control systems for electrically propelled traction vehicles, such as locomotives. Various control arrangements are utilized to control the speed and acceleration of traction motors and thus of vehicles. Commonly this is achieved by comparing a reference signal which is a function of a desired parameter, such as speed or acceleration, with a feedback signal responsive to actual motor or vehicle performance, such as motor current or speed. The error signal thus generated controls electrical parameters of the motor, such as motor current, to maintain desired vehicle performance. Control systems of this type generally respond very rapidly to variations between the reference and feedback signals. However, excessive rates of change in the error signal are detrimental. They can damage the propuslion system, result in wheel slips and slides, or result in vehicle acceleration rates in excess of those compatible with vehicle occupant or equipment capability.

The problem is particularly obvious in, but not limited to, Automatic Train Operation. ATO systems of the type used by railroads and transit properties provide for the transmission of speed command signals from wayside to the vehicle. The command signal, indicative of a command vehicle speed, is utilized as a speed reference signal in the vehicle's speed control system, and is therein compared with actual vehicle speed to control the performance of the traction motors. Each track zone along the route has its own designated command speed, such that contiguous zones may have command signals representative of substantially different speeds. For example a first zone may have a command speed of 40 mph and an adjacent zone may have a command speed of 80 mph. Thus as the train passes from the first to the second zone there is an abrupt change in the command speed signal which, without appropriate rate control circuits, would cause an excessive rate of change of the speed error signal.

Similarly in manually operated vehicles, the operator may initiate abrupt changes in the control signal. Abrupt changes in the control signal may also result during operation because of the characteristics of the traction vehicle equipment.

Accordingly, traction motor control arrangements commonly utilize systems for limiting the rate of change of the control signals. These are referred to as jerk control or transition speed control circuits and are commonly designed to assure that the rate of change of the control signal does not exceed a rate which would result in equipment damage or in excessive vehicle acceleration or deceleration.

Jerk control circuits are inserted into a signal path of the motor control system and are commonly designed so that a step function change in the applied input signal produces a ramp type output signal whose amplitude varies with time at a defined rate. For example, in the above described ATO speed control system the jerk control circuit may be inserted between the speed reference signal source and the speed error comparator which compares the speed reference signal, as modified by the jerk control system, with a feedback signal responsive to vehicle speed. The limited rate of change of the jerk control output signal assures that permissible vehicle acceleration is not exceeded.

The acceleration rates of transportation vehicles are sufficiently low so as to require jerk controls capable of providing ramp outputs varying at extremely low rates of change. For example, in one speed loop embodiment of the type discussed above, a step change of speed reference signal must be converted by the jerk control into the ramp output varying at the rate of about 0.1 volts per second, for each mph per second of permissible acceleration. The maximum permissible acceleration rate of high speed transit vehicles is in the order of 3 mph per second. For this application, the ramp output responsive to a step change in input signal would have to vary at the rate of 0.3 volts per second.

Other types of traction vehicles operate at substantially lower acceleration rates. The permissible acceleration of a freight train is low because of its great mass. Freight train acceleration and deceleration must be limited to low levels to assure that adequate adhesion is maintained and wheel slipping and sliding is avoided. Acceleration must also be low as to limit instantaneous power demand. For example, the maximum acceleration of trains hauling cargo may under some conditions be only 0.3 mph/second, and in the above described embodiment, the jerk control must convert a step change reference signal into a signal varying at the rate of 0.03 volts per second. In some cases, actual acceleration of heavily loaded trains is so extremely low, that the jerk control output in the above described embodiment varies at rates as low as 0.003 volts per second.

It is extremely difficult to manufacture jerk controls satisfying these functional parameters under all required environmental conditions. Prior art jerk controls commonly utilize analog type integrating circuits with resistors and capacitors in the integrating circuit. Because of the required low rates of change the integration circuits have very long time constants. This requires use of extremely large values of capacitance, resistance, and amplification. The magnitude of capacitance is limited by the physical size of the capacitors. The resulting need of extremely large resistance magnitudes and high gain analog amplification imposes severe problems. These include electrical noise problems and excessive variations in impedance magnitudes due to tolerance variations, misadjustments and temperature variations. It is therefore desirable to utilize other types of jerk control systems.

OBJECT OF THE INVENTION

It is an object of this invention to provide an improved motor control arrangement for accurately limiting the rate of change of a motor control signal.

It is a further object to provide an improved jerk control arrangement for precisely limiting the maximum rate of change of traction motor control signal to predetermined low rates so as to permit accurate limitations of the maximum acceleration or deceleration of electrically propelled traction vehicles.

It is yet a further object to provide a rate or speed control system of a drive motor system incorporating a clamped ramp circuit providing accurate operation over a wide range of environmental conditions.

It is yet another object to provide such a jerk control arrangement operable at any one of a plurality of predetermined low rates of change of the control signal.

SUMMARY OF THE INVENTION

The invention relates to a rate control circuit interposed in a motor control system between a source of motor control signals and a utilization circuit of the control signals.

Motor control signals, variable intermediate predetermined magnitude levels, are coupled to the input of comparison means. A clock source provides periodically recurring pulses to a bidirectional counter whose digital output is modified by digital to analog conversion means into an annalog output signal which in turn is coupled to both the utilization circuit of the motor control signals and to the input of the comparison means. Steering means coupled to the output of the comparison means continuously steers the direction of count of the bidirectional counter, i.e., additive or subtractive, responsive to which of the aforesaid signals has the greater magnitude. Means may be provided for modifying the repetition rate of the clock pulses so as to selectively vary the maximum rate of change of the analog output signal applied to the utilization circuit of the motor control system. The preferred embodiment provides switching means responsive to applied signals for selecting anyone of a plurality of rates so as to permit modification of the maximum acceleration or deceleration rates of a traction vehicle during vehicle operation.

The novel features believed characteristic of this invention are set forth with particularity in the appended claims. The organization and manner of operation of the invention, together with further objects and advantages thereof, may best be understood by reference to the following description taken in connection with the accompanying drawings in which:

GENERAL DESCRIPTION

Figure 1:
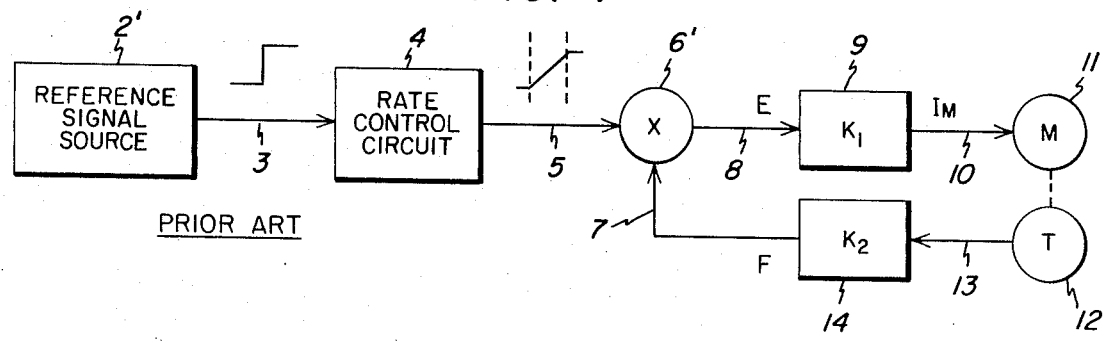
FIG. 1 is a block diagram of one type of prior art motor control system in which the inventive arrangement may be utilized.

The motor rate control circuit of this invention may be utilized in various types of drive motor applications. One type is the prior art speed control arrangement previously referenced, which is illustrated in block diagram form in FIG. 1 and subsequently described. A reference signal source 2' provides a signal representative of desired vehicle speed, on line 3 to a rate control circuit 4 whose output on line 5 is applied to one input of a summing junction, or comparison circuit, 6'. A feedback voltage signal F is applied on line 7 to a second input of the summing junction, such that an error output signal E appears on the output line 8 of the summing junction. This error output signal is amplified and modified by $K_1$ circuit 9 to provide, on its output line 10, a motor current to a motor 11. A feedback path includes a tachometer 12 providing an output signal on line 13 which is proportional to motor speed. This signal is suitably modified by $K_2$ circuit 14 so as to produce a feedback signal F which is applied to the summation junction 6' to complete the speed control feedback loop. In this arrangement the rate control circuit is interposed between the reference signal source 2' and the summation junction 6' in order to limit the maximum rate of change of the reference signal. The reference signal source constitutes a motor control signal source which provides control input signal to the rate control circuit. The output of the rate control circuit is supplied to a motor control signal utilization circuit, which in the described example includes the summation junction and its associated circuitry.

The rate control circuit may obviously be utilized in other types of motor control arrangements, such as torque and acceleration control systems, and may be incorporated in other portions of the circuit, such as the feedback or error signal path. Reference is hereby made to copending Application Ser. No. 407,296, filed Oct. 17, 1973, of Lloyd R. Oster which disclosess alternative utilization of a rate control circuit in traction motor control systems.

Figure 2:
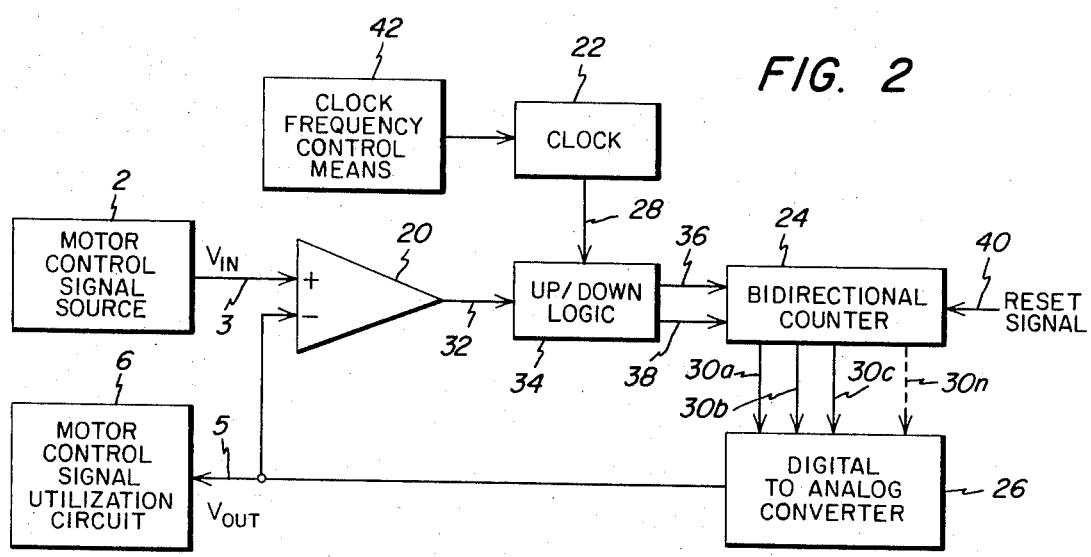
FIG. 2 is a block diagram of an illustrative embodiment of the invention.

Reference is now made to FIG. 2 which discloses a simplified block diagram of Applicant's rate control circuit. A source 2 of motor control signals supplies a control input signal on line 3 to one input of a comparison means 20. A modified signal, corresponding to the control input signal but having a predetermined maximum rate of change, is supplied by line 5 to a motor control signal utilization circuit 6. This signal, hereinafter termed the control output signal, is also coupled to an input of the comparison means 20.

The control output signal is generated by clock source 22, up/down logic 34, bidirectional counter 24, and digital to analog, i.e., D/A, converter 26. The clock source 22 supplies periodically recurring pulses on line 28 through the up/down logic 34 to the bidirectional counter 24. As described below these clock pulses are either added to or subtracted from the residual count in counter 24 depending on whether the pulses are supplied to the counter from the up/down logic on up count line 36 or down count line 38. The digital counter output is supplied by lines 30a, 30b, 30c, . . . .30n to the input of the D/A converter. The analog output of the D/A converter, essentially constitutes the motor control output signal which is supplied by line 5 to the motor signal utilization circuit 6 and to the comparison means 2.

The comparison means 20 supplies a signal output, on line 32 to up/down logic 34, which is indicative of which of its two inputs signals, i.e., the motor control input signal or the motor control output signal, has the greater magnitude. The comparison means, which in the preferred embodiment is a high gain difference amplifier, acts as a switch providing either one of two discretely different signals depending on whether the control input signal or the control output signal has the larger magnitude. The up/down logic circuit in response thereto in effect directs whether the bidirectional counter 24 should add or subtract incoming clock pulses. For this purpose, FIG. 2 illustrates two output lines 36 and 38 connected from the up/down logic to the bidirectional counter. The state of the steering signal on line 32 determines whether clock pulses are supplied to the counter on line 36 or on lines 38. For example, when clock pulses are supplied by line 36, the counter adds clock pulses to the residual count. When clock pulses are supplied by line 38, the counter subtracts clock pulses from the residual count. The counter remains operative during normal operation of the motor control system, and is reset only when the motor control system is shut down. For this purpose a reset signal is applied to the counter by line 40.

Figure 3:
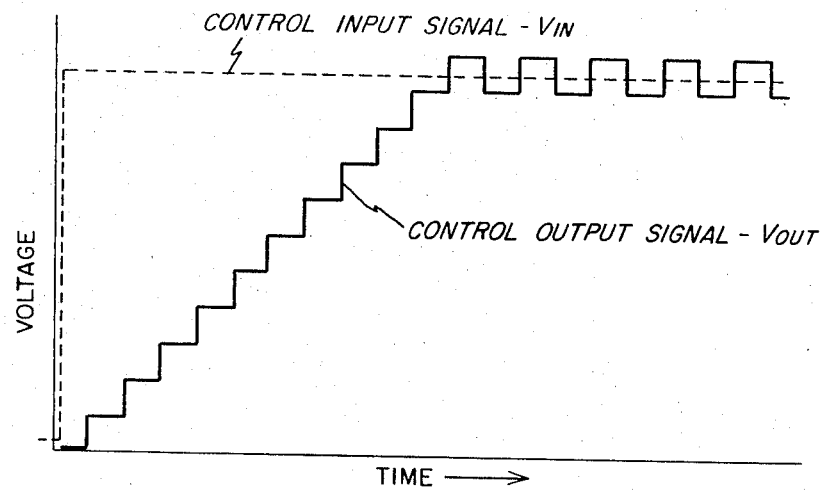
FIG. 3 is a representation of input and output wave forms illustrating operation of the invention acceleration rate control circuit.

Operation of the rate control circuit is explained in connection with FIG. 3. For purposes of explanation it is assumed that the motor control system has just been restarted after shutdown, so that there is an initial zero count in the counter due to its having been previously reset. As a result the initial analog output of the A/D converter, i.e., the motor control output signal $V_{out}$, is zero. It is further assumed that the motor control signal source supplies an abruptly increasing motor control input signal $V_{in}$ on line 3, to comparison means 20. The comparison means 20 now supplies an output signal on line 32 having a state indicative that the magnitude of $V_{in}$ exceeds that of $V_{out}$. In the preferred embodiment, the high gain amplifier used for a comparison means produces one signal of a first polarity in response to $V_{in}$ being greater than $V_{out}$, and another signal of opposite polarity in response to $V_{out}$ being greater than $V_{in}$. The first and second signals each have predetermined amplitudes irrespective of the actual magnitude difference between the $V_{in}$ and $V_{out}$ signals. The magnitude of the first and of the second signal can be suitably tailored to meet the input requirements of the up/down logic 34.

The signal on line 32 appearing when $V_{in}$ exceeds $V_{out}$ causes the up/down logic to supply clock pulses from line 38 through up count line 36 to the bidirectional counter. For explanatory purposes it is assumed that the clock pulses are added by the bidirectional counter during such time as the magnitude of $V_{in}$ exceeds that of $V_{out}$. The digital, e.g., binary, output on lines 30a through 30n thus increases at a rate proportional to the repetition rate of the clock pulses. Similarly the analog output of the A/D converter 26 increases incrementally. As illustrated the control output signal $V_{out}$ therefore, increases stepwise until it exceeds the amplitude of control input signal $V_{in}$. Upon $V_{out}$ exceeding $V_{in}$ the output of the comparison means 20, on line 32, is switched from a first to a second state, e.g., from a first to a second polarity. This causes the up/down logic to switch clock pulses from up count line 36 to the down count line 38. The bidirectional counter therefore subtracts the subsequently applied clock pulse from the residual count. The decrease in the binary count causes a stepped reduction in the output of the control output signal. Since the amplitude of the illustrated $V_{out}$ signal is thus again reduced below that of the $V_{in}$ signal, the state of the signal on line 32 is again changed so that the bidirectional counter will add the subsequent clock pulse. This repetitive switching action continues as long as the control signal remains constant. During such quiescent operation, the $V_{out}$ signal periodically and sequentially increases and decreases equivalent to one digit increments such that the average $V_{out}$ signal corresponds to the $V_{in}$ signal.

In summary during operation of the motor control circuit the clock continuously supplies pulses having a predetermined repetition rate to the bidirectional counter whose output is converted into an analog, i.e., motor control output signal. The magnitude of this analog signal is continuously compared with that of the motor control input signal so as to steer the bidirectional counter between additive and subtractive states dependent on which of the two signals has the greater magnitude. The described circuit thus provides a control output signal which follows the control input signal but with a rate of change limited by the repetition rate of the clock pulses. Clock frequency control means 42 may be connected to the clock source to permit modification of the rate of change during operation of the drive system. The A/D converter output signal is continuously modified by single step increments. By utilizing a sufficiently large counter, an individual increment is sufficiently small so that it can be readily averaged or filtered. In a preferred embodiment of the invention, for example, the maximum amplitude of the control input signal is limited to 10 volts, and the bidirectional counter is a 12 stage binary device having a maximum count capacity slightly in excess of 4,000 counts. Therefore, each incremental step change is limited to 2.5 millivolts. The maximum amplitude of the control input signal on line 3 should be limited within predetermined limits, such as by appropriate design of the motor control signal source, to assure that the maximum count will not exceed the count capacity of the bidirectional counter. This assures that the counter will not overcount so as to accidentally revert to a zero count. In the above described embodiment the normal clock frequency is 10 cycles per second so as to provide for rates of change as low as 0.025 volts per second. However the clock source is designed so that the clock frequency can be adjusted to be below one cycle per second so that the circuit can accommodate rates of change below 2.5 millivolts per second, which in the above described example is equivalent to traction vehicle rates of change below 0.025 mph/sec. The above specified parameters are stated only as examples. For applications to traction vehicle propulsion systems, the pulse recurrency rate can thus be set so that the maximum acceleration of the vehicle is limited to a desired acceleration rate. The arrangement limits the rate of acceleration or of deceleration during propulsion or electric retardation, i.e., electrical braking, of vehicles. Therefore, the term acceleration as used in this application generally includes both acceleration or deceleration within its meaning.

DESCRIPTION OF THE PREFERRED EMBODIMENT

Figure 4:
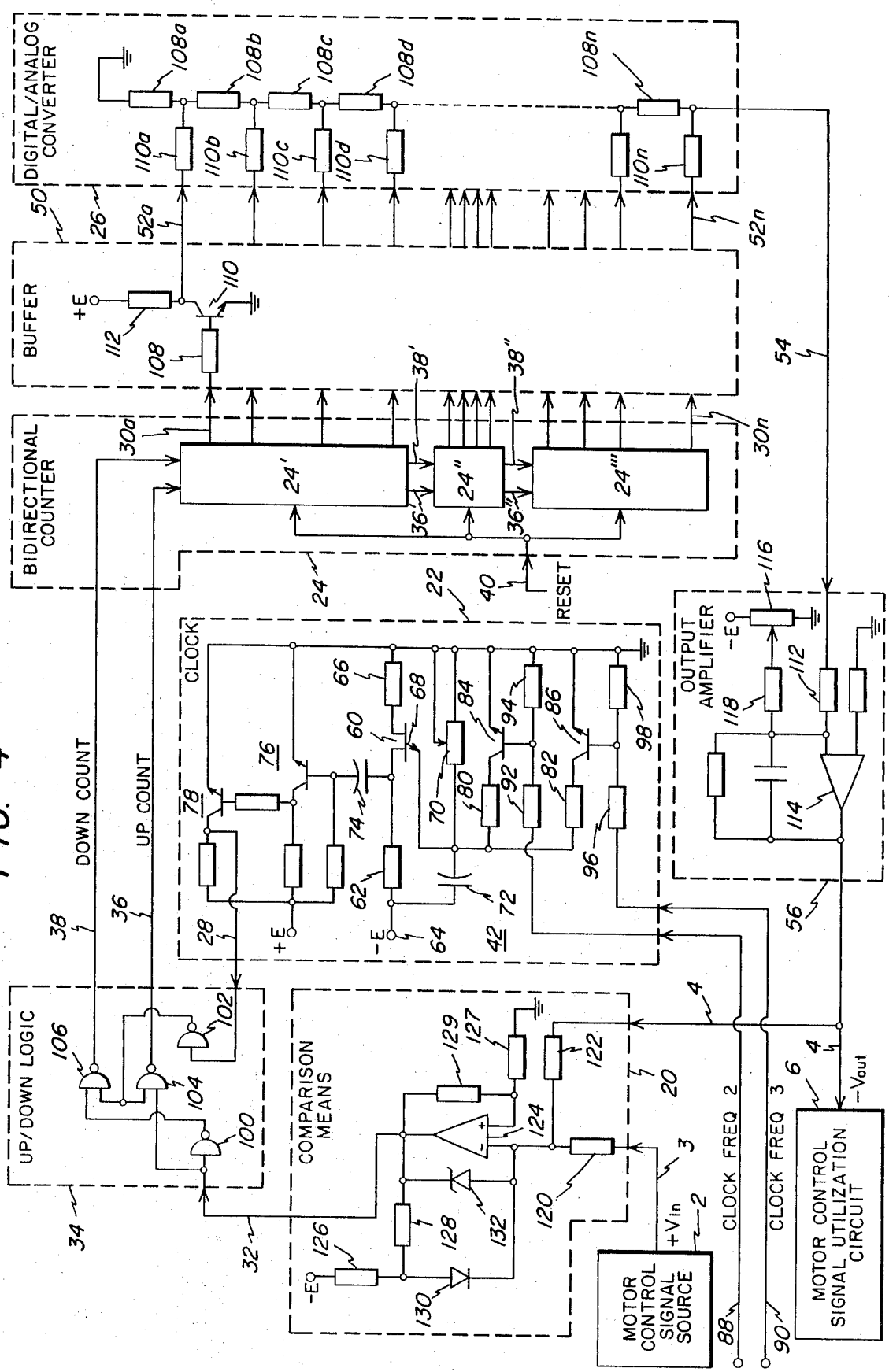
FIG. 4 is a simplified schematic diagram of a preferred embodiment of the invention.

Attention is now directed to FIG. 4 for an explanation of a preferred embodiment of the invention. A clock 22 provides periodically recurrent pulses on line 28 to up/down logic 34 which are fed by either up count line 36 or down count line 38 to bidirectional counter 24. The counter output is supplied by lines 30a through 30n to buffer means 50 whose output is supplied by lines 52a through 52n to digital to analog converter 26. The analog output of the converter is connected by line 54 to an output amplifier 56, which provides as its output on line 4 control output signal $V_{out}$. The control output signal is supplied by line 4 to motor control signal utilization circuit 6 and additionally to comparison means 20. The control input signal $V_{in}$ is supplied by line 3 to an input of the comparison means 20. The comparison means provides an output on line 32 to up/down logic 34 which controls whether clock pulses supplied on line 28 are coupled to the bidirectional counter by up count line 36 or by down count line 38.

CLOCK

The clock source 22 of the preferred embodiment incorporates a unijunction oscillator comprising a unijunction semiconductor device 60 having one base electrode connected through resistor 62 to a source of negative potential 64 and its other base electrode connected through resistor 66 to a common, e.g., ground, terminal. The control electrode 68 of the device is connected to the junction of potentiometer 70 whose other end terminal is connected to ground, and of capacitor 72, whose other terminal is connected to source 64. Periodic pulses generated by this known type of oscillator are coupled by capacitor 74 from the junction of the base electrode and resistor 62 to the buffer amplifier 76 whose output in turn is applied through second buffer amplifier 78 so as to provide clock pulses on output line 28. The repetition rate of these pulses is controlled by the previously recited components of the unijunction oscillator, and in particular by the magnitude of capacitor 72 and potentiometer 70. Accordingly, the rate of change of the circuit can be set to a desired quantity by adjustment of this potentiometer. In the preferred embodiment, for example, adjustment of this potentiometer permits varying the oscillator from below one cycle per second to above 10 cycles per second.

For many applications it is desirable to modify the maximum rate of change of the control signal during actual operation. For example, the initial acceleration rate of vehicles may be limited below the maximum permissible acceleration rates attainable at higher speeds. In some cases, such as with automatic train operation, the rate must be varied automatically. For this reason it is desirable to provide means for selecting various predetermined rates responsive to the application of applied control signals. The preferred embodiment includes clock frequency control means 42 for modifying the maximum rate in response to the application of one or more such signals. Resistor 80 is connected in series circuit with the emitter-collector electrodes of transistor 84 across potentiometer 70. The base electrode of transistor 84 is connected to the junction of resistors 92 and 94. Resistor 94 is also connected to ground and resistor 92 is connected by line 88 to an external source of electric signals. Application of such an external signal, termed clock frequency 2 signal, to the voltage divider network comprising resistors 92 and 94 thus gates on normally cut off transistor 84 so as to shunt it in parallel with potentiometer 70. This decreases the resistance applied between the control and base electrodes of the unijunction device and correspondingly increases the repetition rate of the clock pulses.

Resistor 82 is similarly connected in series circuit with transistor 86 across potentiometer 70, and line 90, adapted to receive a clock frequency 3 signal from an external source, is similarly connected to the voltage divider comprising resistors 96 and 98 such that application of the clock frequency 3 signal gates on device 86 so as to shunt resistor 82 across potentiometer 70. Thus resistors 80 and 82 may be shunted across the potentiometer 70 either singly or in combination by the application of external signals. In the described arrangement the selective application of two discrete clock frequency control signals, which may be supplied by a fixed current source, permits operation at four discrete rates of change. For example, the clock circuit might produce pulses having the following rates; no clock frequency signals — 10 cycles per second; clock frequency signal 2 only — 20 cycles per second; clock frequency signal 3 only — 30 cycles per second; clock frequencies 2 and 3 — 55 cycles per second. The maximum acceleration rate of vehicles can thus during operation be modified throughout a specified range. This, for example, permits acceleration from standstill at a very low rate, and subsequent successively higher acceleration rates at increasing vehicle rates. Appropriate circuits can be used to automatically modify the acceleration or deceleration rates so as to maintain desired speed vs acceleration or other characteristics. The range of attainable clock frequencies and the means for automatically selecting the appropriate frequency within that range can be selected in accordance to the application of the motor control rate circuit.

UP/DOWN LOGIC

The clock pulses are coupled on line 28 to up/down logic 34 and are steered to the bidirectional counter by either up count line 36 or down count line 38 depending upon the state of the steering signal on line 32. Commercial up/down logic units can be utilized for this purpose. In the logic unit used in the preferred embodiment, the clock pulses on line 28 are fed through buffer 102 to one input of each of "and" gates 104 and 106. The steering signal on line 32 is applied directly to the other input of "and" gate 104, and through buffer and inverter 100 to the other input of "and" gate 106. The output of gate 104 is connected to the up count line 36 and the output of gate 106 is connected to down count line 38. During operation, either gate 104 or gate 106, depending on the state of the steering signal on line 32, passes clock pulses to its associated output line. In the up/down logic utilized in the preferred embodiment, the gates pass clock pulses in response to the application of a "binary one" steering signal and block the passage of clock pulses upon application of a "binary zero" steering signal. The steering signal on line 32 has either a binary one state or a binary zero state. In this case, for example, a binary one steering signal consists of a positive voltage, e.g., approximately 5 volts, and a binary zero steering signal consists of a zero or slightly negative voltage, such as − 0.5 volts. The steering signal on line 32 has a "binary one" state, e.g. +5 volts, "and" gate 104 passes clock pulses to up count line 36. However, buffer inverter 100 inverts the state of the steering signal applied to "and" gate 106 such that a "binary zero" signal, e.g., 0 volt, signal is applied to gate 106. This inhibits passage of clock pulses through gate 106. Conversely when the steering signal on line 32 has a "binary zero" state, gate 104 is inhibited from passing clock pulses to line 36. However, buffer inverter 100 supplies a "binary one" signal to gate 106 to permit that gate to supply clock pulses on down count line 38. Thus in the preferred embodiment, when the comparison means provides a binary one signal on steering line 32, clock pulses are supplied to bidirectional counter on up count line 36. Conversely, binary zero signals on steering line 32 results in clock pulses on down count line 37.

BIDIRECTIONAL COUNTER AND BUFFER

The bidirectional counter receives clock pulses from line 36 or 38, and provides a digital output on lines 30a through 30n. The preferred embodiment, for example, utilizes a 12 stage binary counter comprising three commercial four stage counter units 24', 24" and 24'". Each of the counter units upon being filled or emptied passes clock pulses to the next counter unit in a conventional manner. Thus clock pulses supplied to counter 24 will initially be processed by unit 24'. When that unit is filled, or emptied, the clock pulses are coupled by the appropriate one of lines 36' or 38' to unit 24". Similarly when that unit is filled or emptied, the clock pulses are further coupled by the appropriate one of lines 36" to unit 24'". Conventional counter units commonly include flip flops whose output is subject to some voltage variation. Since the binary output of the counter must be translated into an accurate analog signal, these outputs are in the preferred embodiment, coupled through a buffer 50 prior to application to the digital to analog converter 26. In the preferred embodiment each of the twelve counter output lines 30a through 30n is coupled through a buffer switch, and the corresponding buffer output lines 52a through 52n are connected to digital/analog converter 26.

FIG. 4 illustrates one of the buffer switches which is shown connected intermediate lines 30a and 52a. Line 30a is connected by resistor 108 to the base of transistor 110. The emitter electrode is connected to ground and the collector electrode is connected to line 52a, and through resistor 112 to a source of fixed potential, such as for example +15 volts. When there is no signal input on line 30a the transistor is switched off and line 52a, and the collector, is at the fixed potential of the source. Conversely when there is a signal output on line 30a, the transistor is switched on and line 52a is at ground potential. Therefore, lines 52a through 52n each supply regulated voltage signals to the A/D converter.

As initially described, when the control input signal $V_{in}$ exceeds the control output signal the comparison means produces a steering signal on line 32 which causes the digital input to the D/A converter to increase so that the analog output signal from the converter increases toward the magnitude of $V_{in}$. In the preferred embodiment, when $V_{in}$ exceeds $V_{out}$, the comparison means produces a steering signal on line 32 having a binary zero state, e.g., −0.5 volts. The up/down logic accordingly steer the clock pulses to the down count line 36. This causes counter 24 to subtract clock pulses from its residual count. Were it not for buffer 50 the binary input supplied to D/A converter 26 would decrease. However, as previously explained, buffer 50 effectively inverts the counter output signals, on lines 30a through 30n, prior to their application, on lines 52a through 52n, to the converter. For this reason, the counter of the preferred embodiment operates in an inverted manner. Upon application of a reset signal on line 40, the counter is preset so as to be filled, i.e., all of output lines 30a through 30n have a binary one state, e.g., +5 volts. The buffer output lines, however, have a zero state, e.g., 0 volts. Clock pulses supplied to the counter on down count line 36 are subtracted from the residual count. However, because of the buffer inversion, the digital input supplied on lines 52a through 52n will increase incrementally when $V_{in}$ exceeds $V_{out}$.

Conversely when the control output signal $V_{out}$ exceeds the control input signal $V_{in}$, the steering signal on line 32 has a binary one state, e.g., +5 volts, and clock pulses are supplied to the counter on up count line 38. This causes the counter to add pulses to the residual count. However, because of the inversion in buffer 50, the digital input supplied on lines 52a through 52n will decrease incrementally.

DIGITAL TO ANALOG CONVERTER AND OUTPUT AMPLIFIER

In the preferred embodiment binary digital input signals are applied on lines 52a through 52n to the D/A converter to produce an analog output signal on line 54 which is proportional to the binary digital input. FIG. 4 illustrates the application of a known weighing circuit, also known as a R/2R ladder, for this purpose. The ladder comprises resistors 108 a, b, c, d, . . . n connected serially between ground and output line 54. Lines 52a through 52n are each connected, respectively, through resistors 110 a, b, c, d, . . . n, to consecutive junctions of the resistor 108a through 108n ladder. Thus resistor 110a is connected to the junction of resistors 108a and b; resistor 110b is connected to the junction of resistors 108b and c, etc. Line 52n is connected through resistor 110n to the junction of resistor 108n and output line 54. In a conventional R/2R ladder the magnitude of each of the resistors 110a through 110n is twice that of each of the resistors 108a through 108n. In the described example, a binary one input of +15 volts on line 52n, the most significant digit line, would produce an output on line 54 of one half of that voltage, i.e., 7.5 volts. The line 54 output resulting from consecutively lower digit line signals is correspondingly lower, such that a binary one input of +15 volts on line 52a, the least significant digit line, produces an output of about 2 millivolts. If all digital input lines 52a through 52n simultaneously have a +15 volt signal, the output on line 54 of all the signals theoretically is 15 volts. The ladder circuit, however, is subject to loading. If output line 54 were directly applied to comparison means 20, and to the motor control signal utilization circuit 6 this could result in an unpredictable reduction of output voltage.

Accordingly, line 54 is applied to output amplifier 56 whose inverted output signal, $V_{out}$, is coupled by lines 4 to the motor control signal utilization circuit 6 and to comparison means 20. Line 54 is connected through resistor 112 to an input of operational amplifier 114. Potentiometer 116 is connected between a source of negative potential and ground and the potentiometer arm is connected through resistor 118 to the junction of resistor 112 and the amplifier input. In the above described example the offset potentiometer can be adjusted such that the voltage on line 54 is slightly offset, e.g., positive, when the control output signal $V_{out}$, reaches the magnitude of the control input signal. This assures that the counter will never go through zero.

COMPARISON MEANS

The control input signal line 3 and the control output signal line 4 are connected through resistors 120 and 122, respectively, to the negative summing junction of operation amplifier 124, which in the preferred embodiment is so called infinite gain amplifier. The magnitudes of resistors 120 and 122 may of course be chosen to establish the relative gains between the $V_{in}$ and $V_{out}$ signals. In the described example, both are of equal magnitude so as to have unity gain. In the described example, the unlimited error signal output of the amplifier is minus 10 volts in the event $V_{in}$ exceeds $V_{out}$, and plus 10 volts in the event $V_{out}$ exceeds $V_{in}$. The level of the positive signal, indicative of a binary one state, is in the preferred embodiment limited to +5 volts to conform it to the particular input voltage level of the up/down logic. This is accomplished by the network comprising components 126, 128, and 130. Resistors 126 and 128 are connected between a source of fixed negative potential and the output line 32 of amplifier 124. Diode 130 is connected from the junction of resistors 126 and 128 to the negative input terminal of the amplifier. As the amplifier output goes positive, the junction of resistors 126 and 128 becomes more positive, causing conduction of diode 130, so as to clamp the output of the amplifier to the potential set by the ratio of resistors 126 and 128. The level of the negative output voltage, indicative of a binary "zero" state, is in the preferred embodiment limited to about −0.5 volts by means of zener diode 132 connected between the negative input and the output terminals of the amplifier. The described arrangement produces a "binary zero" output; e.g., −0.5 volts, on line 32 when $V_{in}$ exceeds $V_{out}$, and a "binary one" output, e.g., +5 volts, when $V_{out}$ exceeds $V_{in}$.

Resistor 127, connected from the positive input terminal of the amplifier to ground, and resistor 129, connected from the output of the amplifier to the positive input terminal, can be scaled to provide desired hysteresis or dead band. Thus a slightly greater differential between $V_{in}$ and $V_{out}$ may be required to switch the amplifier in one direction, than is required to switch it in the other direction. This prevents amplifier switching at an excessively high, i.e., unstable, rate.

In summary, the control input signal $V_{in}$ and the control output signal $V_{out}$ are compared by the comparison means so as to provide on line 32 a "binary zero" steering signal when $V_{in}$ is greater than $V_{out}$, and a "binary one" signal when $V_{out}$ is greater than $V_{in}$. The up/down logic steers clock pulses from line 28 to the up count line 36 during the presence of a "binary one" signal and to the down count line 38 during the presence of a "binary zero" signal. The combination of the bidirectional counter 24 and buffer 50 operates so that the binary digital input to D/A converter 26 is increased during the presence of a "binary zero" steering signal and is decreased during the presence of a "binary one" steering signal. Accordingly the D/A converter output signal and the motor control output signal on line 4 increases during the presence of the "binary zero" steering signal and decreases during the presence of the "binary one" steering signal. The rate of increase or decrease is limited by the repetition rate of the clock pulses on line 28. Means are provided to adjust this rate, and preferably additional means are provided for selectively modifying the rate in response to applied electrical signals so as to permit automatic variation of the maximum rate of change of the control output signal in response to desired motor control signal parameters.

While the invention has been particularly shown and described with reference to a preferred embodiment, it will be understood by those skilled in the art that changes in form and detail may be made therein without departing from the spirit and scope of the invention. For example, alternate forms of digital counters, converters, steering arrangement, and clock sources may be utilized.

What I claim as new and desire to secure by Letters Patent of the United States is:

1. In a motor control system wherein a motor control signal source supplies motor control input signals for application to a motor control signal utilization circuit which regulates performance of a motor, means for limiting the acceleration rate of said motor comprising:
   a. a clock source generating periodically recurring clock pulses;
   b. bidirectional counting means for algebraically adding said clock pulses to generate a digital count;
   c. conversion means for converting said digital count into a corresponding analog signal;
   d. coupling means to couple said analog signal as a control output signal, to said motor control signal utilization circuit.
   e. steering means connected to continuously cause said bidirectional counting means to selectively add or subtract clock pulses responsive to comparison of the magnitudes of said control input and of said control output signals;
   f. means for establishing the recurence frequency of said clock pulses to limit the maximum incremental change per unit time of the magnitude of the control output signal so that the magnitude of the motor control output signal varies proportionately but at a predetermined maximum rate of change, in respect to the control input signal.

2. The arrangement of claim 1 wherein said steering means comprises comparison means for comparing said control input signal and said control output signal and steering logic means for directing said bidirectional counter to add or subtract clock pulses responsive to which of said aforesaid signals has the greater magnitude.

3. The arrangement of claim 2 wherein said comparison means comprises a high gain difference amplifier having its input connected to receive said aforesaid signals and providing at its output a steering signal of a predetermined first or of a predetermined second state dependent upon which of said signals has the greater magnitude.

4. The arrangement of claim 3, wherein said steering logic means couples clock pulses to either up count or down count responsive to the state of said steering signal input lines of said bidirectional counter.

5. The arrangement of claim 4 wherein said clock pulse source continuously supplies clock pulses to said bidirectional counting means during operation of said propulsion control system, said control input signal being limited to variation intermediate a predetermined voltage magnitude, and the count capacity of said bidirectional counting means exceeding the number of counts required to generate a control output signal said predetermined voltage magnitude so as to prevent reset of said counting means during operation of said propulsion system.

6. The arrangement of claim 5 wherein said coupling means provides a control output signal to said comparison means which signal is offset in respect to said analog output signal sufficiently to prevent undesired reset of said counting means.

7. The arrangement of claim 2 comprising frequency control means responsive to applied frequency control input signals to selectively modify the recurrence frequency of said clock pulses.

8. The arrangement of claim 7 wherein said clock source comprises resistance and capacitance means in an oscillatory circuit for establishing the recurrence frequency of said clock pulses, means for shunting said resistance means with serially connected impedance and semiconductor switching means, said switching means being actuated in response to an electrical signal to shunt said impedance means across said resistance means to modify the recurrence frequency of said clock pulses.

9. The arrangement of claim 1 wherein said bidirectional counting means comprises reset means adapted to be energized in connection with shut down of the motor control system.

10. In an electrical propulsion control system for a traction vehichle wherein a motor control signal source supplies a motor control input signal utilization circuit which regulates performance of the traction motors of the vehicle, means for limiting the maximum acceleration rate of the vehicle comprising:
  a. a clock pulse source generating recurring clock pulses;
  b. bidirectional counting means comprising a steering signal input, up count and down count inputs, and digital count outputs;
  c. up/down logic connected to supply said clock pulses to said up count input in response to a steering signal input in response to a steering signal input having a first state and to supply said clock pulses to said down count input in response to a steering signal input having a second state;
  d. digital to analog conversion means connected to convert the digital count output to a corresponding analog signal output;
  e. comparison on means having inputs, and a steering signal output coupled to the steering signal input of said up/down logic means;
  f. coupling means to couple said analog signal as a control output signal to said motor control signal utilization circuit and to an input of said comparison means;
  g. means for coupling said control input signal from said motor control signal source to input of said comparison means;
  h. said comparison means being constructed to compare the magnitudes of said applied control input and control output signals to supply at its steering signal output a signal having first or second states dependent on which of the compared signals has the greater magnitude;
  i. means for establishing the recurrence frequency of said clock pulses to limit the maximum incremental change per unit time of the magnitude of said control output signal so that the magnitude of the motor control output signal while varying proportionately to said control input signal has its rate of change limited such that the traction vehicle's rate of acceleration is maintained within predetermined limits.

* * * * *

UNITED STATES PATENT OFFICE
CERTIFICATE OF CORRECTION

PATENT NO. : 3,859,581
DATED : Jan. 7, 1975
INVENTOR(S) : Alvin L. Gardner

It is certified that error appears in the above-identified patent and that said Letters Patent are hereby corrected as shown below:

Column 3, line 17, "annalog" should be corrected to -- analog --

Column 12, line 21, delete "." and insert -- ; --

Column 12, line 27, "recurence" should be corrected to -- recurrence --

Column 13, line 20, "vehichle" should be corrected to -- vehicle --

Column 13, line 32, delete "in response to a steering signal"

Column 14, line 1, delete "input"

Column 14, line 7, delete "on"

Signed and sealed this 13th day of May 1975.

(SEAL)
Attest:

RUTH C. MASON
Attesting Officer

C. MARSHALL DANN
Commissioner of Patents
and Trademarks